United States Patent [19]

Hamilton et al.

[11] 3,906,331

[45] Sept. 16, 1975

[54] DC TO DC CONVERTER WITH LINEAR PULSE PROCESSING CIRCUITRY

[75] Inventors: Billy Harold Hamilton, Summit; Frederick Francis Kunzinger, Parsippany; Frank Carl La Porta, Millington, all of N.J.

[73] Assignee: Bell Telephone Laboratories, Incorporated, Murray Hill, N.J.

[22] Filed: May 30, 1974

[21] Appl. No.: 474,714

[52] U.S. Cl. .................. 321/2; 321/19; 324/99 D; 340/253 A; 340/347 AD
[51] Int. Cl. ............................................ H02m 3/32
[58] Field of Search ............. 321/2, 18, 19; 323/17, 323/20, DIG. 1; 324/99 R, 99 D; 340/253 A

[56] References Cited
UNITED STATES PATENTS

| | | | |
|---|---|---|---|
| 3,541,446 | 11/1970 | Prozeller............................ | 324/99 D |
| 3,670,234 | 6/1972 | Joyce................................... | 321/2 X |
| 3,735,235 | 5/1973 | Hamilton et al.................... | 321/18 X |
| 3,737,756 | 6/1973 | Hasley et al....................... | 323/DIG. 1 |
| 3,769,568 | 10/1973 | Hamilton et al....................... | 321/2 |
| 3,818,306 | 6/1974 | Marini............................ | 323/DIG. 1 |

*Primary Examiner*—A. D. Pellinen
*Attorney, Agent, or Firm*—A. G. Steinmetz

[57] ABSTRACT

A DC to DC converter has a dual mode current and voltage regulation circuit and monitoring and metering circuits responsive to digital type control pulse signals. The regulation feedback circuitry is responsive to the relative priorities of the respective control pulse signals. The digital type control pulse signals are generated by modulating circuits in response to sensed converter signals with a time delay relative to a common synchronizing pulse. The time delay is a linear function of the sensed converter signal. The modulating circuits include feedback circuitry to render the percentage time delay of the time delayed pulse invariant with respect to the time frame of each pulse irrespective of variations in the frequency of the common synchronizing pulse and other timing errors in the converter circuit.

12 Claims, 8 Drawing Figures

DC TO DC CONVERTER WITH LINEAR PULSE PROCESSING CIRCUITRY

BACKGROUND OF THE INVENTION

This invention relates to regulated power supply systems. It is more particularly concerned with pulse modulation and signal processing circuits utilized to perform regulation, metering, and monitoring functions in a power supply system. It is specifically concerned with improving the precision and linearity of such circuits.

Digital techniques are being increasingly applied to operate control and monitoring functions in regulated power supply systems. This is due to the increased availability of reliable integrated circuits to perform these functions. One such regulated power supply system utilizing digital regulation techniques with integrated circuit technology is disclosed in U.S. Pat No. 3,769,568 issued to B. H. Hamilton et al. on Oct. 30, 1973 and assigned to the same assignee as this application. The regulated converter circuit disclosed therein utilizes digital type feedback control techniques in which feedback pulses are produced with controlled time delays responsive to conditions to be regulated in a transistor converter circuit. These feedback pulses are produced with a time delay relative to a synchronizing pulse. Several output signal parameters are monitored simultaneously and a separate time delayed pulse responsive to each parameter is generated. The regulatory control of the converter responds to the first received feedback pulse.

It is apparent from the foregoing that a plurality of conditions in the converter circuit may be monitored and controlled. The time delayed pulses responsive to each condition are delayed relative to a common periodic synchronizing trigger pulse generated by a synchronizing source common to all the systems of the converter circuit. A common control circuit is receptive to all feedback pulses and is designed to respond to only the first feedback pulse received. This first feedback pulse is utilized to change conduction in the inverter circuit in a manner to control the value of the output parameter responsible for the generation of the first feedback pulse response.

In accord with the present invention, time delayed signal pulses may also be utilized to perform metering and monitoring functions in addition to the aforedescribed functions. As indicated above, the time delay of the signal pulse is a linear function of the quantity being sensed. All the modulating circuits which monitor the various sensed output parameters and from which the time delayed signal pulses are derived are controlled by a common synchronizing clock source. The accuracy with which these time delay pulses represent the parameters being monitored is to a large extent dependent upon the stability of the clock frequency and the stability of the timing circuits of the modulating circuits. Variations of this frequency and other timing errors which may exist in the converter system could cause error in the linear relationship between the time delay and the parameter being monitored. Should the synchronizing frequency change, the time frame of the time delay is altered and causes an erroneous response to the sensed parameters and conditions in the regulation, metering, and monitoring circuits.

It is therefore an object of the invention to improve the linearity of the transfer characteristics of the parameter sensing modulators and make the output thereof insensitive to the variations in the clock frequency.

It is also an object to increase the precision of the transfer characteristic of the modulators used to monitor signal parameters and conditions and in turn accurately reflect these parameters and conditions in the monitoring and metering circuits.

It is yet another object of the invention to maximize the operating efficiency and simplify the circuitry of an accurate modulator used to monitor signal parameters.

SUMMARY OF THE INVENTION

Therefore, in accordance with the present invention, a plurality of signal modulator systems are operated synchronously by a common clock to convert sensed analog signals into signal pulses with time delays relative to a common synchronous clock pulse. The transfer characteristics of the signal modulator systems are linearized to perform the conversion invariantly to changes in the frequency of the synchronizing clock pulse. This is accomplished by use of a feedback circuit in the modulator circuit to modify the time delay linearly with changes in the synchronizing clock frequency. The feedback circuit linearizes the modulator transfer characteristic by responding to the duty cycle of the modulator output pulse. This response generates a feedback current to balance against the analog signal input current to the modulator. This adjusts the modulator duty cycle to nullify the effects of frequency changes or internal timing errors within the modulator. The effect of any errors in clock frequency is advantageously reduced by the gain of the feedback circuit.

BRIEF DESCRIPTION OF THE DRAWING

Additional features and advantages of the invention will become apparent from the following detailed description taken together with the drawing in which.

DETAILED DESCRIPTION OF THE ILLUSTRATIVE EMBODIMENT

Figure 1:
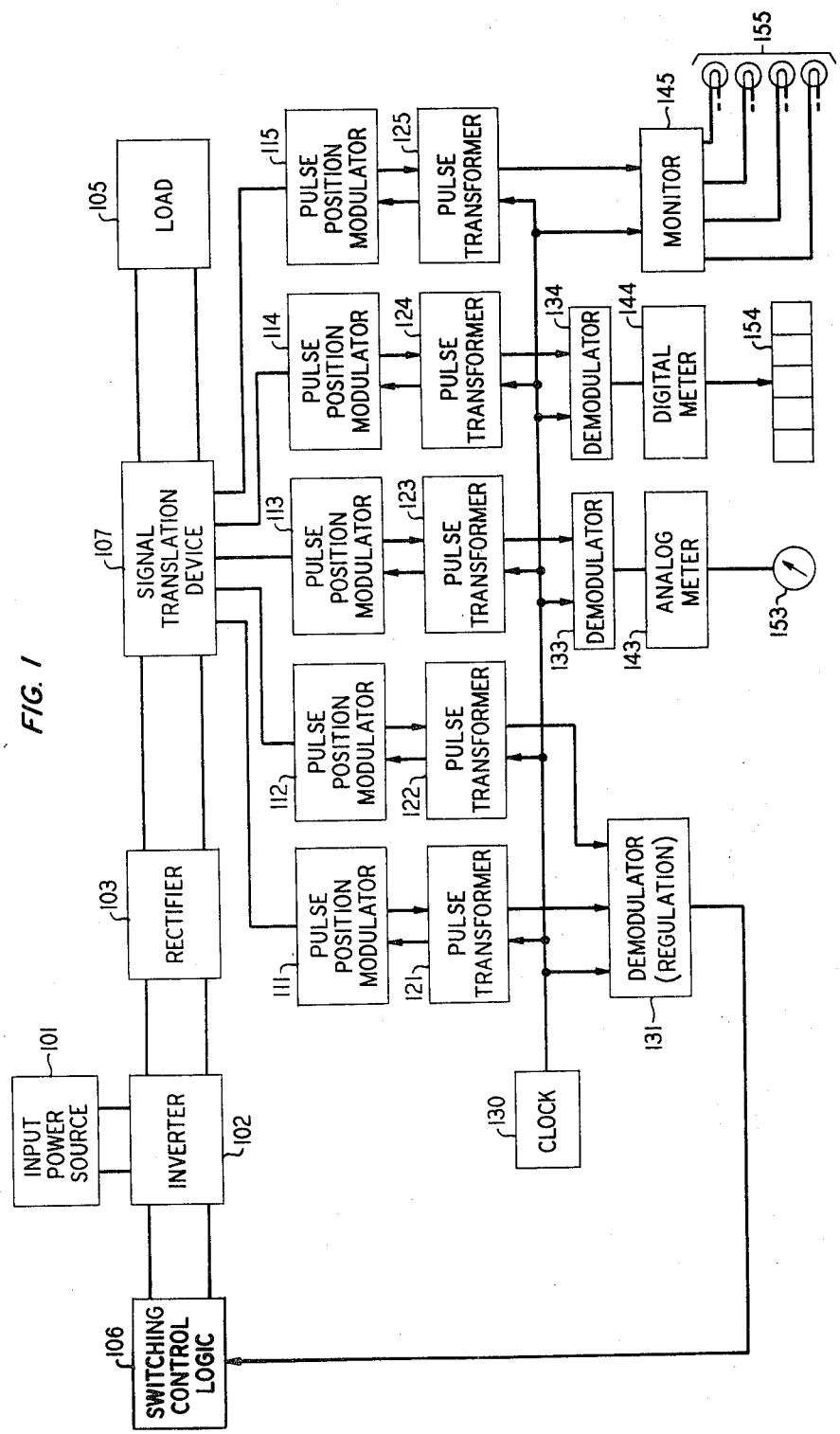
FIG. 1 is a block diagram of a regulated converter circuit having regulation, metering, and monitoring circuits in accordance with the principles of the invention.

A DC to DC converter system utilizing digital type controls is shown in FIG. 1. An input DC power source 101 is shown coupled to energize an inverter circuit 102. The inverter circuit 102 may comprise any standard inverter circuit utilizing switching devices to periodically energize an output transformer. The output transformer of the inverter circuit 102 is coupled to a power rectifier 103 which in turn is coupled, via the signal translator device 107, to a load 105. The signal translation device and is an 107 is such as a shunt or voltage divider integral part of the pulse position modulator 111, 112, 113, 114, and 115 described hereinbelow. They are shown here separately to clearly illustrate the function of the feedback and monitoring controls in the block diagram. The inverter 102 and rectifier 103 comprise the converter circuit which may change the DC voltage or DC current level from that of the input power source to a different DC level at the load 105. The switching devices of the inverter circuit 102 are controlled in response to a switching control logic circuit 106. This is controlled in response to the regulation feedback circuitry described subsequently.

The various output parameters, which may include the output voltage and current of the converter, are sensed by the signal translation device 107 which is located between the rectifier 103 and the load 105. The various signal outputs of the translation device 107 representing the different output signal parameters of the converter are coupled to a plurality of pulse position modulator circuits 111, 112, 113, 114, and 115. Each of the pulse position modulator circuits 111 through 115 responds to a particular sensed analog signal parameter and generates a position modulated pulse signal whose time delay relative to a synchronizing pulse is a linear function of the sensed signal parameter. The position modulated pulse signals are applied to the pulse transformers 121, 122, 123, 124, and 125. The pulse transformers 121 through 125 are coupled to subsequent demodulator circuits which convert the pulse position modulated pulse into a width modulated pulse whose duty cycle is a linear function of the analog signal being sensed.

As shown in FIG. 1, the pulse position modulators 111 and 112 are included in a regulation feedback loop to control the output signals applied to load 105. The pulse position modulators 113, 114, and 115 are coupled to metering and monitoring circuits as described below. The two pulse position modulators 111 and 112 may respectively monitor the output voltage and output current of the converter system. Hence, the time delay of the pulse output of the pulse position modulator 111 would be responsive to the output voltage of the converter and the time delay of the pulse output of the pulse position modulator 112 would be responsive to the output current of the converter. In each instance the duty cycle of the width modulated pulse output of the demodulator is responsive to the output parameter voltage or current of the first pulse position modulated pulse to arrive at its input. The duty cycle of the width modulated pulses, derived for metering and monitoring purposes, is a linear function of the analog signal sensed by the signal translation device 107.

The starting reference of the time delay of the pulses generated by each one of the pulse position modulators 111 through 115 is initiated by the synchronizing trigger pulse output of the synchronizing clock 130.

The synchronizing trigger pulses are applied, via the pulse transformers 121, 122, 123, 124, and 125, to the pulse position modulators 111, 112, 113, 114, and 115.

The outputs of the pulse transformers 121 and 122 are applied to a demodulator circuit 131 which converts the first arriving time delayed pulse into a width modulated pulse whose duration equals the time delay. The starting point of this pulse is determined by the output of the synchronizing clock 130 which is utilized to synchronize the demodulator 131. The width modulated pulse output of the demodulator 131 is applied to the switching control logic 106 where it is utilized to control the switching devices of the inverter 102 and hence to control the magnitude of the output signals of the converter being regulated. The demodulator responds only to the first feedback time delayed pulse applied to it. Hence, the converter may be either voltage or current regulated depending upon which time delayed or position modulated pulse signal arrives first.

The time delayed pulse outputs of the pulse transformers 123 and 124 are applied to the demodulators 133 and 134, respectively. The time delayed pulse output of pulse transformer 125 is applied to a limit monitor 145. The limit monitor 145, as described herein, is a circuit which monitors the duty cycle of the time delayed signal pulse and indicates if the time delay of these pulse signals is less than or greater than predetermined quantized time delays. The indication may take the form of visual signals. The limit monitor 145 compares the sequence of the time delayed pulse with timing pulses generated to mark preselected time slots corresponding to predetermined signal limits. The demodulators 133 and 134 and the limit monitor 145 are synchronized by the synchronizing trigger pulse output of the clock 130. The outputs of demodulators 133 and 134 are applied respectively to an analog meter 143 and a digital meter 144 where they are used to operate respectively an analog dial readout 153 and a digital readout device 154. The output of the limit monitor 145 activates alarm or shutdown signals such as the lamp devices 155.

The advantage of utilization of the pulse transformers 121, 122, 123, 124, and 125, as described in the aforementioned patent, is the ease of transmitting analog signal responsive timing signals while providing isolation between input and output circuits of the converter circuit.

It is readily apparent to those skilled in the art, however, that should the frequency of the synchronizing clock 130 vary, or should other timing errors affecting the frequency occur in the converter circuit, the time delay of the pulse signal transmitted by the pulse transformers may no longer accurately represent the magnitude of the analog signals being monitored.

Figure 2:
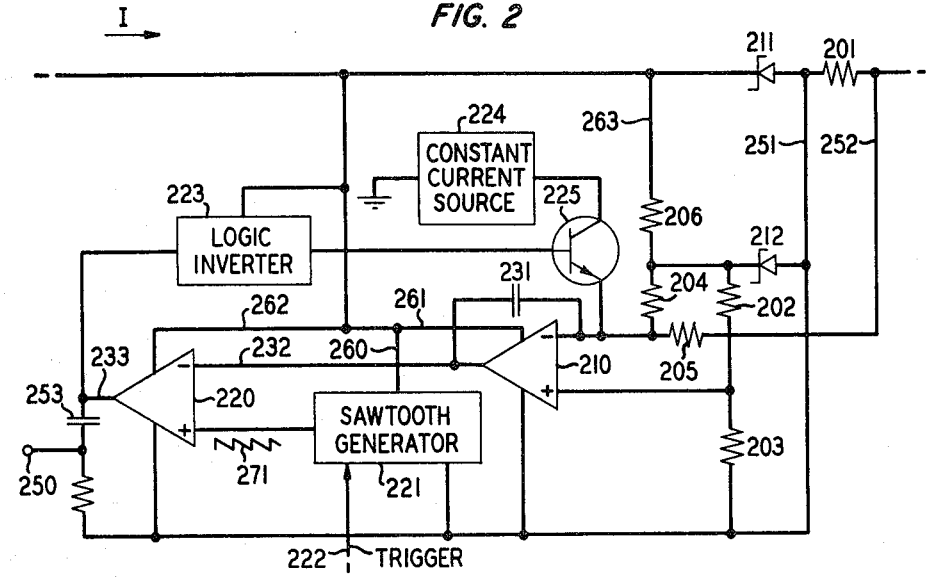
FIG. 2 is a partially schematic and partially block diagrammatic illustration of a pulse position (30 cc.) modulator in accordance with the principles of the invention.

The pulse position modulator circuit shown in FIG. 2 has its transfer characteristics linearized in accordance with the invention so that its transfer characteristic is invariant with respect to any frequency variations of the synchronizing clock source. Each of the pulse position modulators 111, 112, 113, 114, and 115 shown in FIG. 1 senses an analog signal and generates a position modulated pulse whose position or time delay is a linear function of the magnitude of the sensed analog signal. The particular pulse position modulator shown in FIG. 2 senses the output current of the converter and generates a position modulated pulse at the output 250. The position of the output pulse relative to a synchronizing pulse is a linear function of the magnitude of the current sensed in a current sensing resistor 201. This pulse position modulator circuit includes a modulator circuit to convert the analog signal into a width modulated pulse, a pulsed differentiator to derive the position modulated pulse, a self-energization arrangement to derive operating power from the current being sensed, and a demodulator feedback circuit to reduce the sensitivity of the modulator output to frequency and timing errors.

The current sensing resistor 201 is connected in series with the output current path of the converter and the voltage drop across it is representative of the output current. Two sensing leads 251 and 252 are connected to the opposite terminals of resistor 201. The lead 251 is connected, via resistor 203, to the noninverting input of the differential amplifier 210. The lead 252 is connected, via a resistor 205, to an inverting input of amplifier 210. A voltage breakdown diode 212 is connected across the voltage divider comprising resistors 202 and 203 to establish a reference common mode voltage at the noninverting input of the differential amplifier 210. The voltage divider comprising resistors 204 and 205 applies a voltage which is responsive to the voltage across the resistor 201 to the inverting input of the differential amplifier 210. A feedback capacitor 231 connects the inverting input of the differential amplifier 210 to its output on lead 232. The value of the capacitor 231 is selected so that the time constant of this feedback circuit has a much greater duration than the time period of the frequency at which the clock source operates.

The output of the differential amplifier 210 is applied to the inverting input of a comparator 220, via lead 232. A sawtooth wave generated by a sawtooth wave generator 221 is applied to the noninverting input of the comparator 220. An appropriate sawtooth signal is shown by the voltage waveform 271 in FIG. 2. The sawtooth wave generator 221 is synchronized by trigger pulses applied via lead 222 which are generated by the synchronizing clock source 130 as shown in FIG. 1. The sawtooth generator 221 operates by charging a capacitor in response to a fixed charging current. The capacitor is periodically discharged in response to each trigger pulse input. The fixed charging current may be derived from the voltage breakdown diode 212 which is energized by the converter's current output. The output of the comparator circuit 220 on lead 233 is at a high output state as long as the voltage output of the sawtooth generator 221 exceeds the voltage output of the differential amplifier 210. The comparator switches to a low output state when the decreasing sawtooth voltage equals the output voltage of the differential amplifier 210. It is readily apparent that the width of the output pulse of the comparator 220 is a linear function of the magnitude of the current being sensed in the current sensing resistor 201.

The output of the comparator on lead 233 is coupled, via the differentiating capacitor 253, to the output terminal 250 of the pulse position modulator. This position modulated pulse is applied to a pulse transformer such as the pulse transformers 121 through 125 shown in FIG. 1. The differentiating capacitor 253 differentiates the trailing edge of the width modulated pulse and derives therefrom a negative timing or position modulated pulse whose time delay with respect to the synchronizing pulse is a linear function of the current being sensed. This negative timing pulse is transmitted to a demodulator on the primary side of the converter which converts it to a width modulated pulse to control various functions of the converter circuit.

The breakdown diode 211 is connected in series with the current sensing resistor 201 to provide the necessary energizing power to operate the differential amplifier, the comparator, and the sawtooth generator without the need for an auxiliary power supply. The voltage drop across the breakdown diode 211 is applied via leads 260, 261, and 262 to power the sawtooth generator 221, the differential amplifier 210, and the comparator 220, respectively. The voltage drop across the breakdown diode 211 is also applied, via lead 263 and resistor 206, to energize the breakdown diode 212 to establish the reference common mode voltage of the differential amplifier 210.

The current flowing through the breakdown diode 212 and resistors 202 and 203 is returned to the main current path of the converter, via lead 251. This current flows through the current sensing resistor 201 and is subject to regulation. A small drain from the voltage divider including resistor 204, and 205 connected to the noninverting input of amplifier 210 is returned to the output current via lead 252. All of the current used to power the pulse position modulator is returned to the main current path thereby minimizing current loss in the current sensing arrangement.

The position modulated pulse output of the pulse position modulator are coupled to demodulator circuits which derive a width modulated pulse therefrom. The duty cycle of the pulse output of the demodulator controls the regulating, metering, and monitoring functions. The accuracy of a modulator-demodulator combination without compensation such as described herein is subject to impairment due to variations in the synchronizing clock frequency and variations in the characteristics of the timing circuits of the pulse position modulator. The uncompensated pulse position modulator generates a position modulated pulse whose time delay relative to a synchronizing pulse is an approximately linear function of the analog signal being sensed. This time delay in an uncompensated pulse position modulator is dependent upon the charging rate of the sawtooth wave generator 221 and does not change with frequency. If the system frequency changes, the duty cycle of the pulse position modulator therefore changes for a fixed input. Therefore, the output of the demodulator, which responds to the duty cycle, changes causing an error in the system response, the demodulator output is no longer an accurate representation of the analog signal parameter being monitored. These altered output signals affect the readout of metering and monitoring circuits and the regulation of the converter since these circuits respond to duty cycle and not to the time delay.

The demodulator feedback circuit of the pulse position modulator operates to maintain the output of the combination modulator-demodulator circuit invariant to variations in the synchronizing clock frequency and in the timing circuits of the modulator. While slight duty cycle variations may be tolerated in closed regulatory feedback circuit loops, the errors caused by these variations are not acceptable in the open loop metering and monitoring circuits.

The demodulator feedback circuit comprises a constant current source 224, a transistor switch 225, and a signal logic polarity inverter circuit 223. The feedback path of this circuit couples the output of the comparator circuit 220 at lead 233 to the inverting input of the operational amplifier 210. The logic polarity state of the input of the comparator 220 is inverted by the signal inverter circuit 223 which applies this inverted signal to the control electrode of the transistor switch 225. The transistor switch 225 couples the constant current source 224 to the inverting input of the differential amplifier 210.

When the output of the comparator 220 is in a high state, the low state output of inverter 223 biases transistor 225 nonconducting. Conversely, when the output of the comparator 220 is in its low state, the transistor 225 is biased conducting. It is apparent from the foregoing that the average value of the current transmitted by the switching transistor 225 is summed with the modulator input current flowing through resistors 204 and 205 which is derived from the converter output current. The integrating feedback capacitor 231 of the differential amplifier 210 averages the two input currents, compensates for the demodulation feedback loop, and controls the frequency response of the transfer characteristics of the pulse width modulator.

The feedback current is inversely proportional to the duty cycle of the output signal of the comparator 220. As the duty cycle approaches unity, the feedback current approaches zero. Similarly, as the duty cycle of the output signal of the comparator 220 approaches zero the average value of the feedback current over the entire cycle approaches the value of the constant current. The feedback current modifies the slope of the transfer characteristic of the pulse position modulator so that the duty cycle of the output signal of the comparator 220 is a linear function of the sum of the currents applied to the input of the inverting input of the differential amplifier 210.

Both the modulator and demodulator feedback circuits operate on the basis of the same duty cycle. Hence, the effects of any timing errors due to frequency variations of the synchronizing clock or variations in the amplitude of the sawtooth wave are reduced by the gain of the demodulator feedback circuit. Inasmuch as demodulator circuits are inherently more linear than modulator circuits, the use of a demodulator feedback circuit to compensate a modulator improves the linearity of the modulator. The residual nonlinearity in the feedback demodulator and the subsequent demodulator to the modulator tend to be compensated. The linearity of the combination is superior to the linearity of the component parts of the combination.

Figure 3:
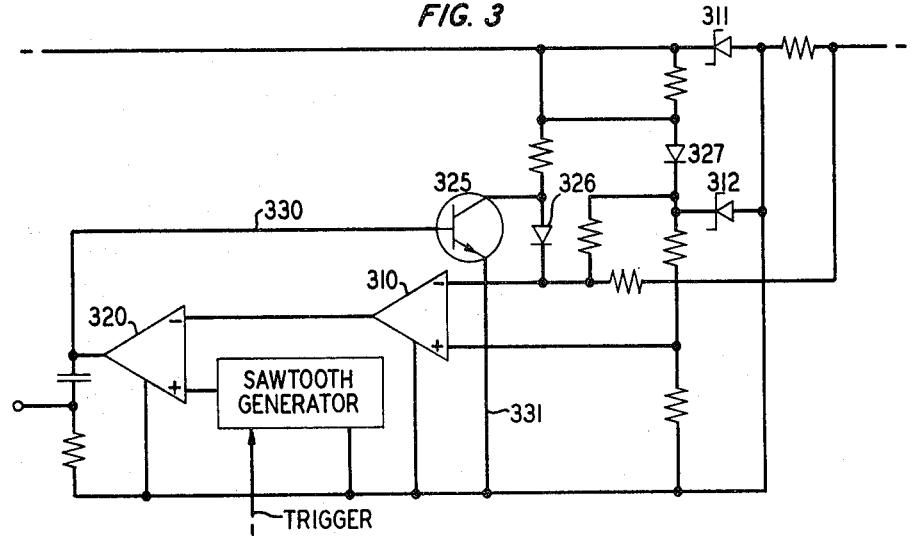
FIG. 3 is a partially schematic and a partially block diagrammatic illustration of a pulse position (30 cc.) modulator in accordance with the principles of the invention.

The pulse position modulator shown in FIG. 3 utilizes a selectively operative constant current source in the demodulator feedback circuit. The constant current of the demodulator feedback loop is derived from the voltage breakdown diode supplying the reference voltage source for the noninverting input of the differential amplifier 310. This circuit arrangement advantageously utilizes the characteristic properties of the differential amplifier 310 and eliminates the need for a separately energized constant current source. The demodulator circuit comprises a switching transistor 325 and a current steering diode 326. A diode 327 is included to provide temperature compensation for diode 326. The output of the comparator 320 is coupled to the control electrode of the switching transistor 325, via lead 330.

The constant current for the demodulator feedback circuit is derived from the constant voltage reference source established by the breakdown diodes 311 and 312. This constant current is switched by the transistor 325 and applied to or diverted from the inverting input of the differential amplifier 310 in response to the output of the comparator 320. If the output of the comparator 320 is in a high state, the transistor 325 is biased conducting and the constant current is diverted from the inverting input of the differential amplifier 310 and bypassed via lead 331 to ground. If the output of the comparator 320 is in a low state, the constant current is applied, via diode 326, to the inverting input of the differential amplifier 310. It is apparent to those skilled in the art that the current supplied to the inverting input of differential amplifier 310 is not the same as the current bypassed to ground. The constant current source connected to the inverting input of the differential amplifier 310 is selectively operative. The current is constant during application to the inverting input of the differential amplifier 310. The inverting input of the differential amplifier 310 is a virtually constant voltage point. Hence, the breakdown diodes 311 and 312 effectively regulate the current at a constant value. The current increases when it ia switched to the reference node at the anode terminal of the diode 312 via transistor 325, however, this current does not operate to linearize the transfer characteristic of the modulator and its increase in magnitude is of no consequence. The diode 327 is matched to diode 326 to compensate for temperature variations affecting the forward voltage drop of diode 326.

The pulse transformer shown in FIG. 3 is suitable for transmitting the oppositely directed trigger and signal pulses in applications such as disclosed in FIG. 1. The pulse transformer 401 comprises a primary winding 402 coupled to the primary side of the converter circuit and a secondary winding 403 coupled to the pulse position modulators on the secondary side of the converter circuit. The synchronizing clock pulses which have a positive polarity are applied, via leads 407 and 408, to the primary winding 402 of the pulse transformer 401. The synchronizing pulses are transformed to the secondary winding 403 and transmitted, via the diode 411 and lead 404, to the synchronizing trigger input of the pulse position modulators.

The negative signal timing pulse output of the pulse position modulator is applied to lead 405 and is transmitted, via diode 410 to the secondary winding 403. This timing pulse is coupled to the appropriate control, monitoring or metering circuitry on the primary side of the converter.

Figure 4:
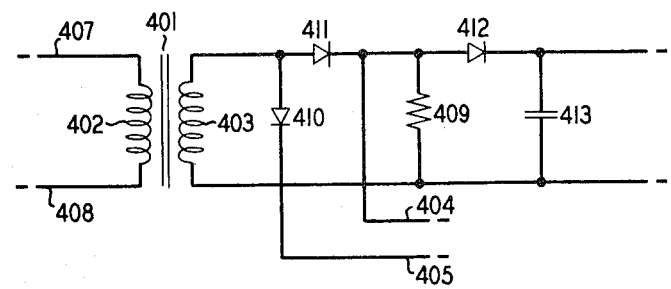
FIG. 4 is a schematic illustration of a pulse transformer in accordance with the invention suitable for use in deriving the pulse position modulated signal from the output of the pulse position (30 cc.) modulator of FIG. 2 and 3.

The pulse transformer shown in FIG. 4 has been adapted to derive power from the synchronizing trigger pulses for application to energize control functions on the secondary side of the converter circuit. The pulse position modulators illustrated in FIG. 2 and 3 are shown deriving energy from the output signal being sensed. If this output signal is insufficient in magnitude to supply the necessary energy, the energy of the synchronizing trigger pulse may be increased sufficiently so that the energy to operate the pulse position modulator circuits may be derived from the synchronizing trigger pulse.

The pulse transformer circuit to derive energy from the synchronizing trigger pulse comprises a resistor 409, a steering diode 412, and an energy storage capacitor 413. The positive synchronizing trigger pulses are transmitted, via the diode 412, to the storage capacitor 413 which stores energy therefrom. The average energy stored on the capacitor 413 can be readily used to energize the modulator circuits or other circuits located on the secondary side of the converter circuit.

The limit monitor circuit 145 defined hereinabove and shown in FIG. 1 monitors a selected output signal and activates one or more of the appropriate alarm lamps 155 when the output signal being monitored exceeds or falls below predetermined signal levels. The limit monitor circuit 145 quantizes the time delay of the signal pulse by noting its occurrence relative to digitally established time slots.

Figure 5:
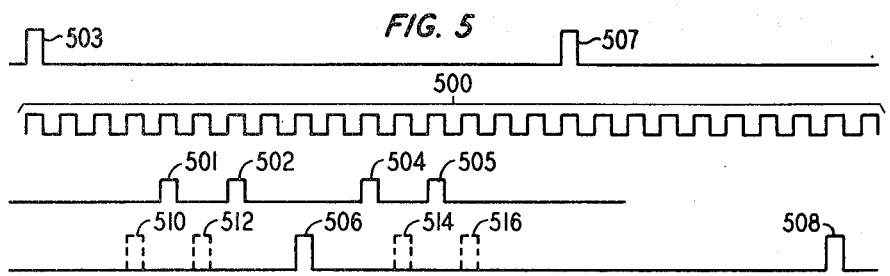
FIG. 5 illustrates voltage waveforms to assist in describing the operation of the pulse sequence detector circuit in FIG. 6.
Figure 6:
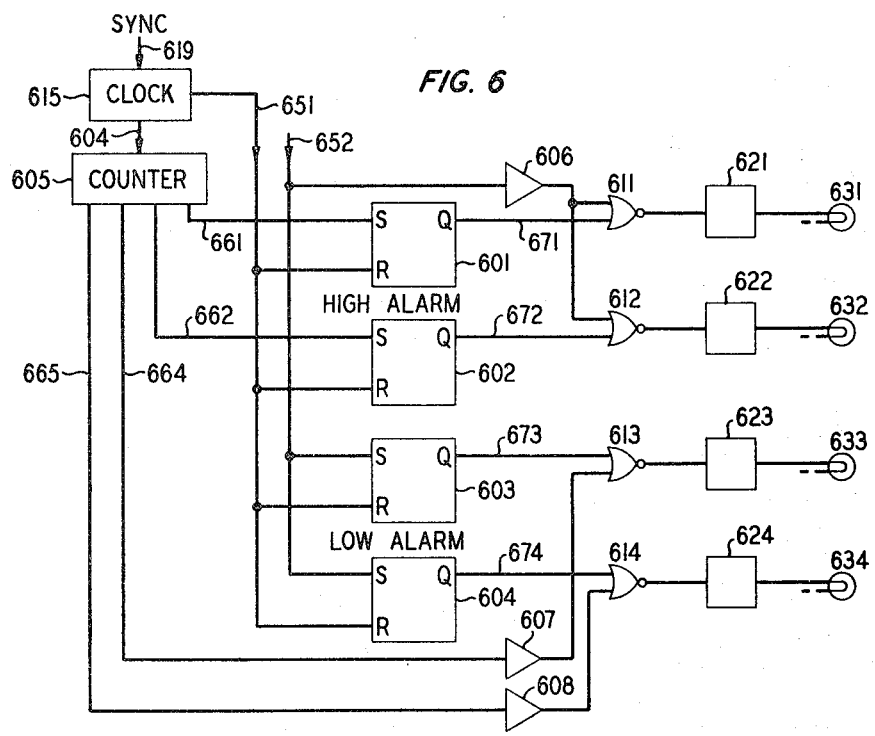
FIG. 6 is a block diagram of a pulse sequence detector circuit in accordance with the invention.

The pulse sequence detector shown in FIG. 6 is utilized to provide two high and two low alarm signals. The two high alarm signals indicate respectively if the signal exceeds its regulated value by a slight or larger magnitude. A slight excess of the signal activates a first alarm. The larger magnitude activates the second alarm in addition to the first alarm. The two low alarms operate similarly in monitoring signals having low magnitudes. The sequence detector may be best explained by describing its operation with reference to the voltage waveforms shown in FIG. 5.

The synchronizing trigger pulse, of which two successive pulses 503 and 507 are shown in FIG. 5, are applied to the lead 651 of the sequence pulse detector. The clock 615 generates a train of pulses, shown by pulses 500 in FIG. 5, at a much higher frequency than the frequency of the synchronizing pulses of the converter. This pulse output is applied, via lead 604, to a counter 605. The counter counts the pulse output and at preselected counts generates two high alarm slot marker pulses 501 and 502 on output leads 661 and 662 and two low alarm time slot marker pulses 504 and 505 on output leads 664 and 665.

The two pulses 506 and 508 shown in FIG. 5 represent two successive signal pulses such as might be applied to the pulse sequence detector when the signal being monitored is within the normal signal limits of the converter. The two pulses 510 and 512 as shown in phantom form represent probable signal pulses in response to a very high and nominally high signal, respectively. The two pulses 514 and 516 as shown in phantom form represent probable signal pulses in response to a nominally low and very low signal, respectively. The signal pulses are applied to lead 652 of the pulse sequence detector.

The pulse sequence detector processes the signal pulses and compares their time occurrence relative to the occurrence of the time slot marker pulses which are generated by the counter 605 in response to the synchronized clock 615. The sequence detector activates one or both of either its high or low alarms if the signal pulse occurs outside the acceptable boundary limits established by the time slot marker pulses. The pulse sequence detector comprises a high alarm detector and a low alarm detector. The high alarm detector comprises two bistable multivibrators 601 and 602, an isolation amplifier 606, two NOR gates 611 and 612, the two alarm indicators 621 and 622 and two associated indicator lamps 631 and 632. The low alarm detector comprises the two bistable multivibrators 603 and 604, the two isolation amplifiers 607 and 608, the two NOR gates 613 and 614, the two alarm indicators 623 and 624 and two associated indicator lamps 633 and 634.

The operation of the pulse sequence detector may be best understood by describing its operation in response to the various pulses illustrated in FIG. 5. In the high alarm detector the synchronizing pulse 503 applied to lead 651 resets both of the bistable multivibrators 601 and 602. These two multivibrators in their reset state have a low output signal state on their output leads 671 and 672. The outputs 671 and 672 are coupled to the NOR gates 611 and 612, respectively. Subsequent to the arrival of the synchronizing trigger pulse 503 the two time slot marker pulses 501 and 502 are applied, via leads 661 and 662, to set the bistable multivibrators 601 and 602, respectively. This produces a high output signal state at the two outputs 671 and 672. As shown in FIG. 5, the signal pulse 506 arrives after both the multivibrators 601 and 602 are set. This signal pulse is applied, via the isolation amplifier 606, to both the NOR gates 611 and 612. Due to the high signal state output on leads 671 and 672 at this time, the signal pulse is not transmitted to either the alarm circuits 621 or 622. If, however, the output signal being monitored is high and the signal pulses have occurred in the time slot indicated by the phantom pulse 510 shown in FIG. 5, both alarm indicators 621 and 622 and their associated indicator lamps 631 and 632 will be activated. The pulse 510 arrives before either bistable multivibrator 601 or 602 has been set by a time slot marker pulse. The two NOR gates 611 and 612 are hence operative to transmit signal pullses in response to the low signal state on leads 671 and 672. The NOR gates 611 and 612 transmit the signal pulse 510 to the alarm indicators 621 and 622, respectively. Similarly, if the signal pulse occurs in the time slot position indicated by the phantom pulse 512 shown in FIG. 5, only the alarm indicator 622 is activated. The occurrence of the time slot marker pulse 501 sets the bistable multivibrator 601 and hence disables transmission through NOR gate 611. Since the multivibrator 602 is not set, the signal pulse is transmitted by the NOR gate to the alarm indicator 622.

The low alarm detection of the pulse sequence detector utilizes the signal and time slot marker pulse connections to operate the alarm indicators 623 and 624, and the associated indicator lamps 633 and 634, respectively. As in the high alarm detector, the two bistable multivibrator circuits 603 and 604 are reset by the synchronizing pulse on lead 651 placing their respective outputs in a low signal state condition. The signal pulse 506 sets the two multivibrators 603 and 604 and produces a high signal state on leads 673 and 674. This disables transmission through the NOR gates 613 and 614 to the alarm indicators 623 and 624. Should however, the signal pulse occur at the time shown by the phantom pulse 514 shown in FIG. 5, the time slot marker pulses on lead 664 occur before the bistable multivibrator 603 is set by the signal pulse. This time slot marker pulse is transmitted by the isolation amplifier 607 to the NOR gate 613 and transmitted thereby to the alarm indicator 623. The signal pulse shown by phantom pulse 514 sets the bistable multivibrator 604 before the occurrence to the time slot marker pulse 505 and hence the alarm indicator 624 is not activated. If the signal pulse occurs at the phantom pulse position 516 as shown in FIG. 5, the bistable multivibrator 604 is not set and the NOR gate 614 transmits the time slot marker pulse 505 to the alarm indicator 624. The pulse sequence detector, as is apparent from the foregoing, can be readily controlled by adjustment of the counter output to establish the desired upper and lower alarm limits to monitor the output of the converter.

Figure 7:
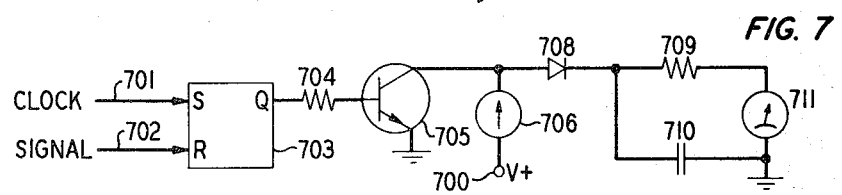
FIG. 7 is a partially schematic and partially block diagrammatic illustration of an analog meter according to the invention.

FIG. 7 illustrates an analog meter readout circuit operative in response to the time delayed signal pulse. The analog meter is connected to the demodulator circuit 703 which may comprise a bistable multivibrator. The demodulator or multivibrator circuit 703 corresponds to the demodulator 133 shown in FIG. 1. The demodulator or multivibrator 703 is responsive to the synchronizing and signal pulses applied to it, via leads 701 and 702, respectively. A DC voltage V applied to the terminal 700 is used to energize a constant current source 706 which is connected to a transistor 705 and, via diode 708, to a storage capacitor 710, and an analog meter 711.

The bistable multivibrator 703 is set in response to the synchronizing pulse applied via lead 701. The resulting low output state of the multivibrator 703 is applied, via resistor 704, to the control electrode of transistor 705 biasing it into its nonconducting state. During this nonconducting period the output of the current source 706 flows via diode 708 into the storage capacitor 710 and, via resistor 709, into the analog meter 711. The storage capacitor causes the average current flowing through diode 708 to flow into meter 711.

The signal pulse applied to lead 702 resets the multivibrator 703 and it assumes a high output state. The high signal state biases the transistor 705 into its conducting state. This completes a current path which diverts the current output of the current source 706 to ground. It is apparent from the foregoing that the time delayed pulse is readily converted into an analog signal for analog metering purposes.

Figure 8:
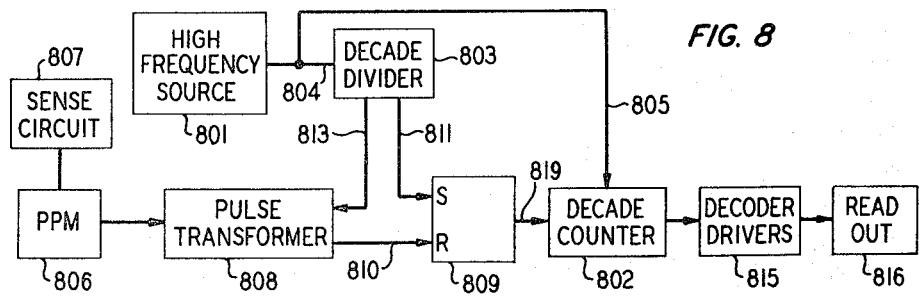
FIG. 8 is a block diagram of a digital meter according to the invention.

A digital meter suitable for applications, such as are shown utilizing digital meters in FIG. 1, is illustrated in block diagrammatic form in FIG. 8. The digital meter therein includes a high frequency clock source 801 which may be the clock source 130 in FIG. 1 and which is coupled to a decade divider 803, via lead 804, and to a pulse counter 802 via lead 805. The analog signal to be measured is detected by a sensing circuit 807.

The decade divider 803 divides the clock output of the clock source 801 into two frequency levels. A low frequency signal is applied via lead 811 to periodically set the counter 802. The higher frequency signal is applied via lead 813 and pulse transformer 808 to synchronize the pulse position modulator. In the present example the clock frequency may be assumed to be one megahertz. The decade divider 803 generates a one hertz signal and a 100 hertz signal which it applies to output leads 811 and 813, respectively.

The one hertz signal on lead 811 is utilized to set the bistable multivibrator 809. The 100 hertz signal on lead 813 is utilized to synchronize the pulse position modulator 806. The time delayed pulse output of the pulse position modulator 806 is applied via transformer 808 and lead 810 to the reset input of the bistable multivibrator 809. The bistable multivibrator 809 is periodically set by the one hertz pulse. The output of the bistable multivibrator is applied via lead 819 to the decade counter 802 to enable its counting action.

The counter 802 is a count down type and in the example counts down to the sensed current level. The time delayed pulse output of the pulse position modulator 806 resets the bistable multivibrator 809. The output of the bistable multivibrator in its reset condition disables the counter 802. During the set time of the bistable multivibrator 809 the counter 802 responds to the one megahertz signal. The count attained is a linear function of the sensed analog signal. The count is applied to the decoder driver 815 which activates the readout 816.

The pulse position modulator 806 is continuously reset by the 100 hertz signal. However, the counter is reset by the one hertz signal. This frequency reduction in the count is utilized to reduce flicker in the readout. The decoder driver 815 converts the output of the decade counter 802 to a numerical value which is displayed on the readout device 816. The readout device 816 may comprise light emitting diodes or other suitable equivalents thereof. The digital meter described hereinabove is ideally suited to the time delay measuring technique disclosed hereinabove and it will be apparent to those skilled in the art that any desired degree of accuracy can be obtained by selection of appropriate frequencies.

What is claimed is:

1. A modulator circuit for application in signal sensing arrangements comprising, means to accept analog signals, means to accept a reference signal, a differential amplifier including a first input connected to said means to accept analog signals and a second input connected to said means to accept a reference signal, a sawtooth wave generator including means to accept a synchronizing signal, a comparator including a first input connected to the output of said differential amplifier and a second input connected to the output of said sawtooth wave generator, and a feedback circuit coupling the output of said comparator to said first input connected to said means to accept analog signals and including a constant current source, a switch having a main conduction path coupled to said constant current source and connected to control the application of current by said constant current source to said first input connected to said means to accept analog signals, and means to control said switch responsive to the output of said comparator whereby the current of the current source is balanced against the current input of said means to accept analog signals so that the output of said modulator circuit is insensitive to changes in frequency of the synchronizing signal.

2. A modulator circuit as defined in claim 1 wherein said means to accept analog signals and said means to accept a reference signal comprises, a sensing impedance, a first, second, third, and fourth impedance connected in series, the series connected impedances being connected in parallel with said sensing impedance, a voltage breakdown diode connected in parallel with said third and fourth impedances, the junction of said first and second impedances being connected to the first input of said differential amplifier and the junction of said third and fourth impedances being connected to the second input of said differential amplifier.

3. A modulator circuit as defined in claim 2 further including means to derive circuit energizing bias signals from analog signals being sensed in said sensing impedance comprising, a second voltage breakdown diode connected in series with said sensing impedance, the junction of said sensing impedance and one terminal of said second voltage breakdown diode and the other terminal of said second voltage breakdown diode being coupled across the circuits of said modulator circuit to be energized, and means to return the bias signal derived from said second voltage breakdown diode to a circuit in series with said sensing impedance.

4. A modulator circuit as defined in claim 3 further including, means to return the signal drained from the path of said sensing impedance by said means to accept analog signals to a circuit in series with said sensing impedance comprising a fifth impedance interconnecting a junction of said second and third impedances with said other terminal of said second voltage breakdown diode.

5. A modulator circuit as defined in claim 1 further including, an output circuit comprising a pulse transformer including a primary and a secondary winding, said primary winding coupled to the output of said comparator and a first steering diode to transmit pulses of one polarity corresponding to the pulse output of said modulator, and a second steering diode to transmit pulses of an opposite polarity corresponding to said synchronizing signal.

6. A modulator circuit as defined in claim 1 wherein, said switch comprises a transistor whose collector-emitter path couples said constant current source to said first input connected to said means to accept analog signals, and said means to control said switch comprises means responsive to the polarity of the output of said comparator to control the biasing of the control electrode of said transistor.

7. A modulator circuit as defined in claim 1 wherein said means to accept analog signals and said means to accept a reference signal comprise, a sensing impedance, a steering diode, and a first, second, third, and fourth impedance connected in a series circuit, the series circuit connected in parallel with said sensing impedance, a voltage breakdown diode connected in parallel with said third and fourth impedances, the junction of said steering diode and said second impedance being connected to the first input of said differential amplifier, and the junction of said third and fourth impedances being connected to the second input of said differential amplifier, a second voltage breakdown diode connected in series with said sensing impedance, a transistor having its collector-emitter path interconnecting the junction of said first impedance and said steering diode with the junction of said sensing impedance and said second voltage breakdown diode, and the control electrode of said transistor being coupled to the output of said comparator.

8. Signal processing circuitry for a DC to DC converter comprising, means to sense the signal outputs of said converter, a source of synchronizing signals, means to generate pulse position modulated signals whose delay in time relative to said synchronizing signals is proportional to the signal outputs sensed by said means to sense including a differential amplifier having its differential inputs responsive to the magnitude of the signal output sensed by said means to sense, a comparator to generate a modulated pulse whose width is proportional to the output of said differential amplifier, and means to differentiate said modulated pulse to generate said pulse position modulated signal, feedback means coupling the output of said comparator to the input of said differential amplifier to compensate for variations in the frequency of said source of synchronizing signals comprising, a current source, gating means controlling the application of said current source to the input of said differential amplifier, and means to enable said gating means in response to the output of said comparator.

9. Signal processing circuitry as defined in claim 8 wherein said means to sense the signal outputs comprises, a signal sensing impedance connected in a main conduction path of said converter, a first, second, third, and fourth impedance connected in a series circuit, said series circuit shunting said sensing impedance, the junction of said first and second impedances being coupled to an inverting input of said differential amplifier, the junction of said third and fourth impedances being coupled to a noninverting input of said differential amplifier, a voltage breakdown diode shunting said third and fourth impedances, and a fifth impedance coupling the junction of said second and third impedances to the main conduction path of said converter, whereby the sensing signal used to actuate the signal processing circuitry is returned to the main conduction path of the converter.

10. Signal processing circuitry as defined in claim 8 wherein said means to sense includes a sensing impedance coupled to the conduction path of the signal being sensed, a steering diode circuit including a first impedance, a second impedance, a third impedance, and a fourth impedance, said series circuit shunting said sensing impedance, a second shunt connection shunting said third and fourth impedances and including a voltage breakdown diode, the junction of said first impedance and said steering diode being connected to a first input of said differential amplifier, the junction of said third and fourth impedances being connected to a second input of said differential amplifier, and a current drain means having a main conducting path coupling the junction of said steering diode and said second impedance to the junction of said sensing impedance and said voltage breakdown diode, and said fourth impedance and a control electrode of said current drain means coupled to the output of said comparator means.

11. Signal processing circuitry as defined in claim 10 further including, a compensating diode having a temperature characteristic complementary to said steering diode and included in said second shunt connection.

12. Signal processing circuitry as defined in claim 8 further including, means to establish reference pulses having selected time delays relative to said synchronizing signal, means to compare the time delay of said pulse position modulated signal with respect to the sequence of said reference pulses, comprising, a plurality of gating means, each gating means individually responsive to different ones of said reference pulses, means to apply said pulse position modulated signal to said plurality of gating means, and alarm indicator means responsive to pulse position modulated signals transmitted by said plurality of gating means.

* * * * *

UNITED STATES PATENT AND TRADEMARK OFFICE
CERTIFICATE OF CORRECTION

PATENT NO. : 3,906,331

DATED : September 16, 1975

INVENTOR(S) : Billy H. Hamilton, Frederick F. Kunzinger and Frank C. La Porta

It is certified that error appears in the above-identified patent and that said Letters Patent are hereby corrected as shown below:

Column 2, line 42, delete "(30 cc.)"; line 46, delete "(30 cc.)"; line 52, delete "(30 cc.)". Column 3, line 9, after "device" delete "and is an"; line 10, after "divider" insert --and is an--. Column 8, line 23, "ia" should be --is--; line 31, "FIG. 3" should be --FIG. 4--. Column 14, line 28, after "diode" insert --a series--.

Signed and Sealed this third Day of February 1976

[SEAL]

Attest:

RUTH C. MASON
*Attesting Officer*

C. MARSHALL DANN
*Commissioner of Patents and Trademarks*